(12) United States Patent  
Maveli et al.

(10) Patent No.: US 8,077,730 B2  
(45) Date of Patent: *Dec. 13, 2011

(54) METHOD AND APPARATUS FOR PROVIDING VIRTUAL PORTS WITH ATTACHED VIRTUAL DEVICES IN A STORAGE AREA NETWORK

(75) Inventors: Naveen S. Maveli, Sunnyvale, CA (US); Subhojit Roy, Sunnyvale, CA (US); Richard L Hammons, Hollister, CA (US); Carlos Alonso, Los Gatos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/556,371

(22) Filed: Sep. 9, 2009

(65) Prior Publication Data

US 2010/0232450 A1   Sep. 16, 2010

Related U.S. Application Data

(63) Continuation of application No. 10/356,659, filed on Jan. 31, 2003, now Pat. No. 7,606,239.

(51) Int. Cl.  
*H04L 12/28* (2006.01)

(52) U.S. Cl. ......... 370/398; 370/399; 709/213; 709/226

(58) Field of Classification Search .................. None  
See application file for complete search history.

(56) References Cited

U.S. PATENT DOCUMENTS

| | | | |
|---|---|---|---|
| 4,155,119 A | 5/1979 | De Ward et al. | |
| 5,651,005 A | 7/1997 | Kwok et al. | |
| 6,151,331 A | 11/2000 | Wilson | |
| 6,260,120 B1 | 7/2001 | Blumenau et al. | |
| 6,845,395 B1 | 1/2005 | Blumenau et al. | |
| 6,895,024 B1 | 5/2005 | Drake et al. | |
| 6,968,401 B2 | 11/2005 | McBrearty et al. | |
| 7,103,653 B2 | 9/2006 | Iwatani | |
| 7,548,975 B2 * | 6/2009 | Kumar et al. | 709/226 |
| 7,606,239 B2 * | 10/2009 | Maveli et al. | 370/398 |
| 2002/0010790 A1 | 1/2002 | Ellis et al. | |
| 2002/0103943 A1 | 8/2002 | Lo et al. | |
| 2002/0112113 A1 | 8/2002 | Karpoff et al. | |
| 2003/0002503 A1 | 1/2003 | Brewer et al. | |
| 2003/0005248 A1 | 1/2003 | Selkirk et al. | |
| 2003/0037127 A1 | 2/2003 | Shah et al. | |
| 2003/0037275 A1 | 2/2003 | Bakke et al. | |
| 2003/0061220 A1 | 3/2003 | Ibrahim et al. | |

(Continued)

OTHER PUBLICATIONS

"Fibre Channel Methodologies for Interconnects (FC-MI) Rev 1.8," NCITS working draft proposed Technical Report, Sep. 28, 2001, pp. 118.

"Fibre Channel—Fabric Generic Requirements (FC-FG)" American National Standards Institute, Dec. 4, 1996, pp. 34.

"Fibre Channel Protocol for SCSI," American National Standards Institute, Inc., Apr. 8, 1996, pp. 78.

"Fibre Channel Generic Services (FC-GS) Rev 3.1," American National Standard for Information Systems, Aug. 7, 1996, pp. 100.

"Fibre Channel Switch Fabric (FC-SW) Rev 3.3" NCITS working draft proposed American National Standard for Information Technology, Oct. 21, 1997, pp. 108.

(Continued)

*Primary Examiner* — Robert Wilson  
(74) *Attorney, Agent, or Firm* — Wong, Cabello, Lutsch, Rutherford & Brucculeri, L.L.P.

(57) ABSTRACT

Systems particularly a virtualization switch or a storage device, which include virtual ports connected to virtual devices with virtual worldwide names and virtual LUNs. Because Fibre Channel environment hosts can track worldwide names from one port to another and allow continuity in that regard, the virtual worldwide names are provided with relevant virtual LUNs and connected these to virtual ports so that the virtual devices can be moved as desired to overcome failures or to allow load balancing.

18 Claims, 9 Drawing Sheets

U.S. PATENT DOCUMENTS

| | | |
|---|---|---|
| 2003/0093541 A1 | 5/2003 | Lolayekar et al. |
| 2003/0131182 A1 | 7/2003 | Kumar et al. |
| 2003/0149848 A1 | 8/2003 | Ibrahim et al. |
| 2003/0172149 A1 | 9/2003 | Edsall et al. |
| 2003/0200149 A1 | 10/2003 | Gonzalez et al. |
| 2003/0210686 A1 | 11/2003 | Terrell et al. |
| 2004/0028063 A1 | 2/2004 | Roy et al. |
| 2004/0030857 A1 | 2/2004 | Krakirian et al. |

OTHER PUBLICATIONS

"Fibre Channel Switch Fabric—2 (FC-SW-2) Rev 5.3" NCITS working draft proposed American National Standard for Information Technology, Jun. 26, 2001, pp. 208.

"Fibre Channel Physical and Signaling Interface (FC-PH) Rev 4.3," pp. 15-31, 90-132 & 205-222, working draft proposed American National Standard for Information Systems, Jun. 1, 1994.

* cited by examiner

METHOD AND APPARATUS FOR PROVIDING VIRTUAL PORTS WITH ATTACHED VIRTUAL DEVICES IN A STORAGE AREA NETWORK

CROSS REFERENCE TO RELATED APPLICATIONS

This continuation application claims priority to U.S. patent application Ser. No. 10/356,659, entitled "Method and Apparatus for Providing Virtual Ports with Attached Virtual Devices in a Storage Area Network," filed Jan. 31, 2003, which is hereby incorporated by reference.

This application is also related to and incorporates by reference, U.S. patent application Ser. No. 10/209,743, entitled "Method And Apparatus For Virtualizing Storage Devices Inside A Storage Area Network Fabric" by Naveen S. Maveli, Richard A. Walter, Cirillo Lino Costantino, Subhojit Roy, Carlos Alonso, Michael Yiu-Wing Pong, Shahe H. Krakirian, Subbarao Arumilli, Vincent Isip, Daniel Ji Yong Park Chung, Stephen D. Elstad and Dennis Makisihma, filed Jul. 31, 2002; Ser. No. 10/209,742, entitled "Host Bus Adaptor-Based Virtualization Switch" by Subhojit Roy, Richard A. Walter, Cirillo Lino Costantino, Naveen S. Maveli, Carlos Alonso, and Michael Yiu-Wing Pong, filed Jul. 31, 2002; Ser. No. 10/209,694, entitled "Hardware-Based Translating Virtualization Switch" by Shahe H. Krakirian, Richard A. Walter, Subbarao Arumilli, Cirillo Lino Costantino, L. Vincent M. Isip, Subhojit Roy, Naveen S. Maveli, Daniel Ji Yong Park Chung, Stephen D. Elstad, Dennis H. Makishima, and Daniel Y. Chung, filed Jul. 31, 2002 such applications hereby being incorporated by reference.

BACKGROUND OF THE INVENTION

1. Field of the Invention

The present invention relates to storage area networks, and more particularly to virtualization of ports, devices and logic units of such storage area network.

2. Description of the Related Art

As computer network operations have expanded over the years, storage requirements have become very high. It is desirable to have a large number of users access common storage elements to minimize the cost of obtaining sufficient storage elements to hold the required data. However, this has been difficult to do because of the configuration of the particular storage devices. Originally storage devices were directly connected to the relevant host computer. Thus, it was required to provide enough storage connected to each host as would be needed by the particular applications running on that host. This would often result in a requirement of buying significantly more storage than immediately required based on potential growth plans for the particular host. However, if those plans did not go forward, significant amounts of storage connected to that particular host would go unused, therefore wasting the money utilized to purchase such attached storage. Additionally, it was very expensive, difficult and time consuming to transfer unused data storage to a computer in need of additional storage, so the money remained effectively wasted.

In an attempt to solve this problem storage area networks (SANs) were developed. In a SAN the storage devices are not locally attached to the particular hosts but are connected to a host or series of hosts through a switched fabric, where each particular host can access each particular storage device. In this manner multiple hosts could share particular storage devices so that storage space could be more readily allocated between the particular applications on the hosts. While this was a great improvement over locally attached storage, the problem does develop in that a particular storage unit can be underutilized or fills up due to misallocations or because of limitations of the particular storage units. So the problem was reduced, but not eliminated.

To further address this problem and allow administrators to freely add and substitute storage as desired for the particular network environment, there has been a great push to virtualizing the storage subsystem, even on a SAN. In a virtualized environment the hosts will just see very virtual large disks of the appropriate size needed, the size generally being very flexible according to the particular host needs. A virtualization management device allocates the particular needs of each host among a series of storage units attached to the SAN. Elements somewhere in the network would convert the virtual requests into physical requests to the proper storage unit.

Another problem that has occurred in SANs is the inability to move logical unit numbers (LUNs) around inside a storage unit. While virtualization may help hide particular volumes and the physical linkages from the hosts, the virtualization system still will direct activity to a particular port and LUN. However, if there are particular problems, as in a failure of a particular unit, it would be desirable to move the particular LUN to a different location. Alternatively, it would be desirable to be able to move LUNs and ports to load balance the system to allow better overall throughput. However, existing units do not allow this flexibility because a particular LUN is tied to a particular physical port and therefore cannot be readily moved. Thus there currently are problems if a physical unit fails or if the system is not properly load balanced.

BRIEF SUMMARY OF THE INVENTION

Systems according to the present invention, particularly a virtualization switch or a storage device, include virtual ports connected to virtual devices with virtual worldwide names and virtual LUNs. Because Fibre Channel environment hosts can track worldwide names from one port to another and allow continuity in that regard, it is desirable to provide virtual worldwide names with relevant virtual LUNs and connect these to virtual ports so that the virtual devices can be moved as desired to overcome failures or to allow load balancing.

DETAILED DESCRIPTION OF THE INVENTION

Figure 1:
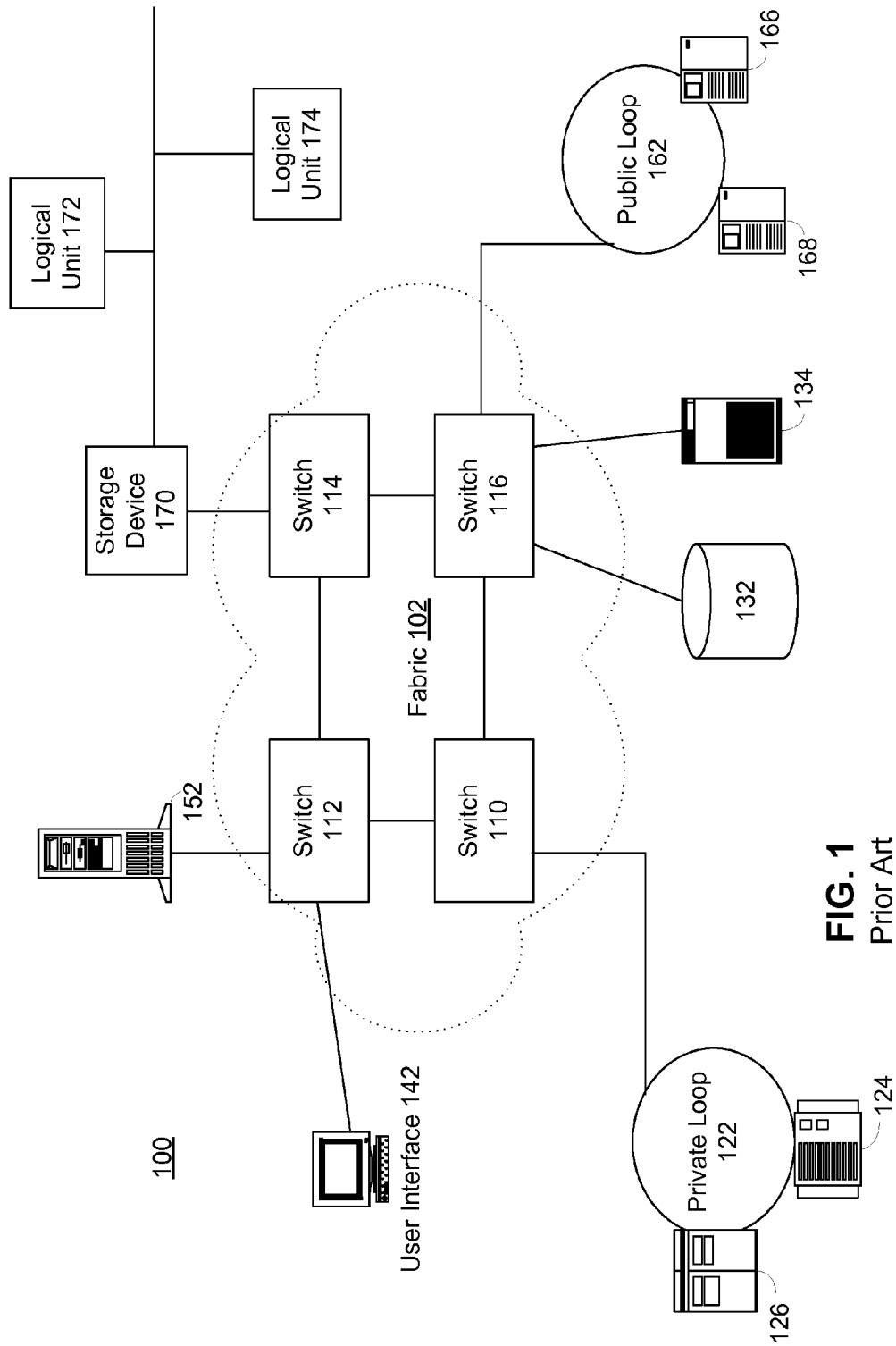
FIG. 1 is a general view of a storage area network (SAN)

Referring now to FIG. 1, a storage area network (SAN) 100 generally illustrating a prior art design is shown. A fabric 102 is the heart of the SAN 100. The fabric 102 is formed of a series of switches 110, 112, 114, and 116, preferably Fibre Channel switches according to the Fibre Channel specifications. The switches 110-116 are interconnected to provide a full mesh, allowing any nodes to connect to any other nodes. Various nodes and devices can be connected to the fabric 102. For example a private loop 122 according to the Fibre Channel loop protocol is connected to switch 110, with hosts 124 and 126 connected to the private loop 122. That way the hosts 124 and 126 can communicate through the switch 110 to other devices. Storage unit 132, preferably a unit containing disks, and a tape drive 134 are connected to switch 116. A user interface 142, such as a workstation, is connected to switch 112, as is an additional host 152. A public loop 162 is connected to switch 116 with disk storage units 166 and 168, preferably RAID storage arrays, to provide storage capacity. A storage device 170 is shown as being connected to switch 114, with the storage device 170 having a logical unit 172 and a logical unit 174. It is understood that this is a very simplified view of a SAN 100 with representative storage devices and hosts connected to the fabric 102. It is understood that quite often significantly more devices and switches are used to develop the full SAN 100.

Figure 2:
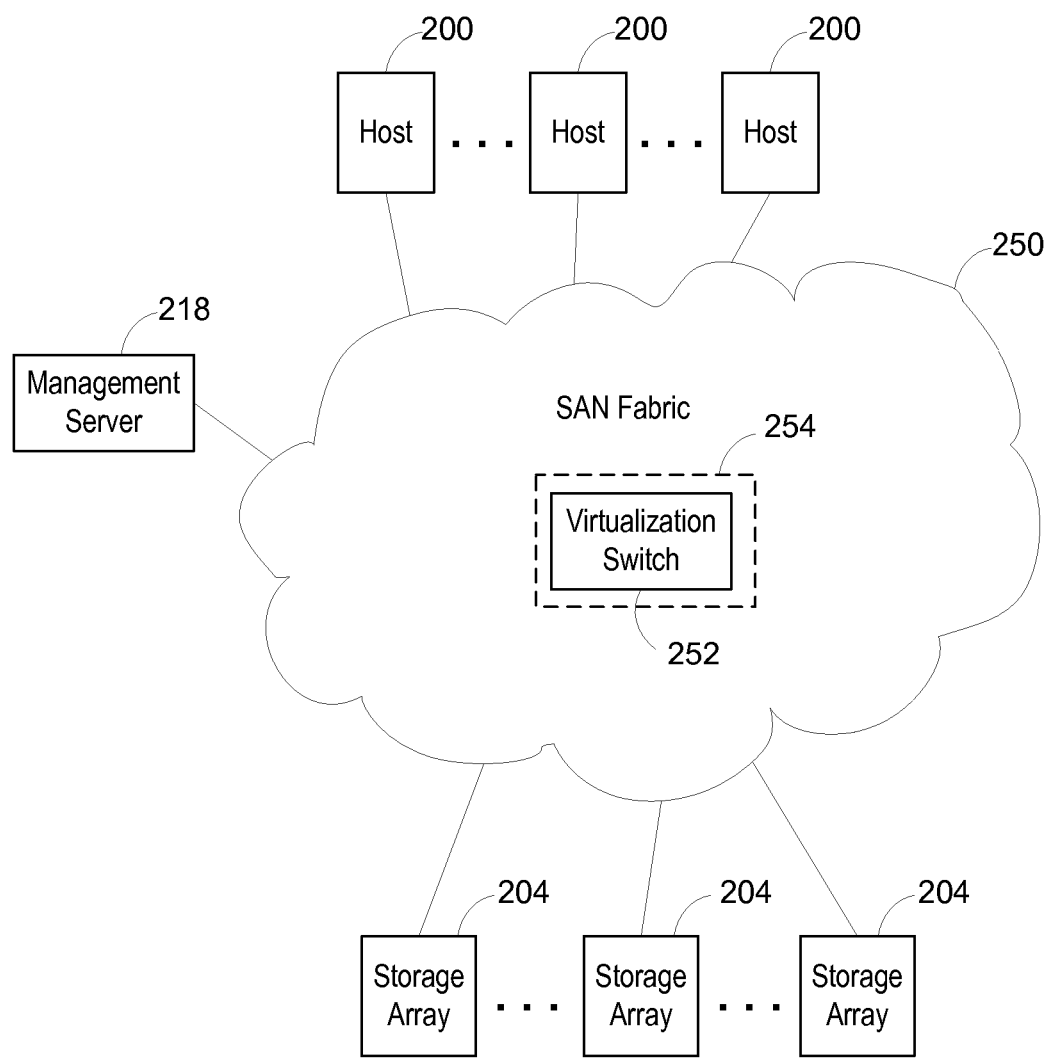
FIG. 2 is a block diagram of a SAN showing the location of a virtualization switch.

Referring now to FIG. 2, a block diagram according to the preferred embodiment of the invention is illustrated. In FIG. 2 the hosts 200 are connected to a SAN fabric 250. Similarly, storage arrays 204 are also connected to the SAN fabric 250. However, as opposed to the SAN fabric 102 that is made with conventional Fibre Channel switches, the fabric 250 includes a virtualization switch 252, which acts as a virtualization agent 254. A management server 218 is connected to the fabric 250 to manage and provide information to the virtualization switch 252 and to the hosts 200. As the virtualization switch 252 can provide the virtualization remapping functions at wire speed, performance is not a particular problem and this solution can much more readily handle much larger fabrics by the simple addition of additional virtualization switches 252 as needed. For more details on virtualization and a virtualization switch, please refer to the applications incorporated above.

Figure 3:
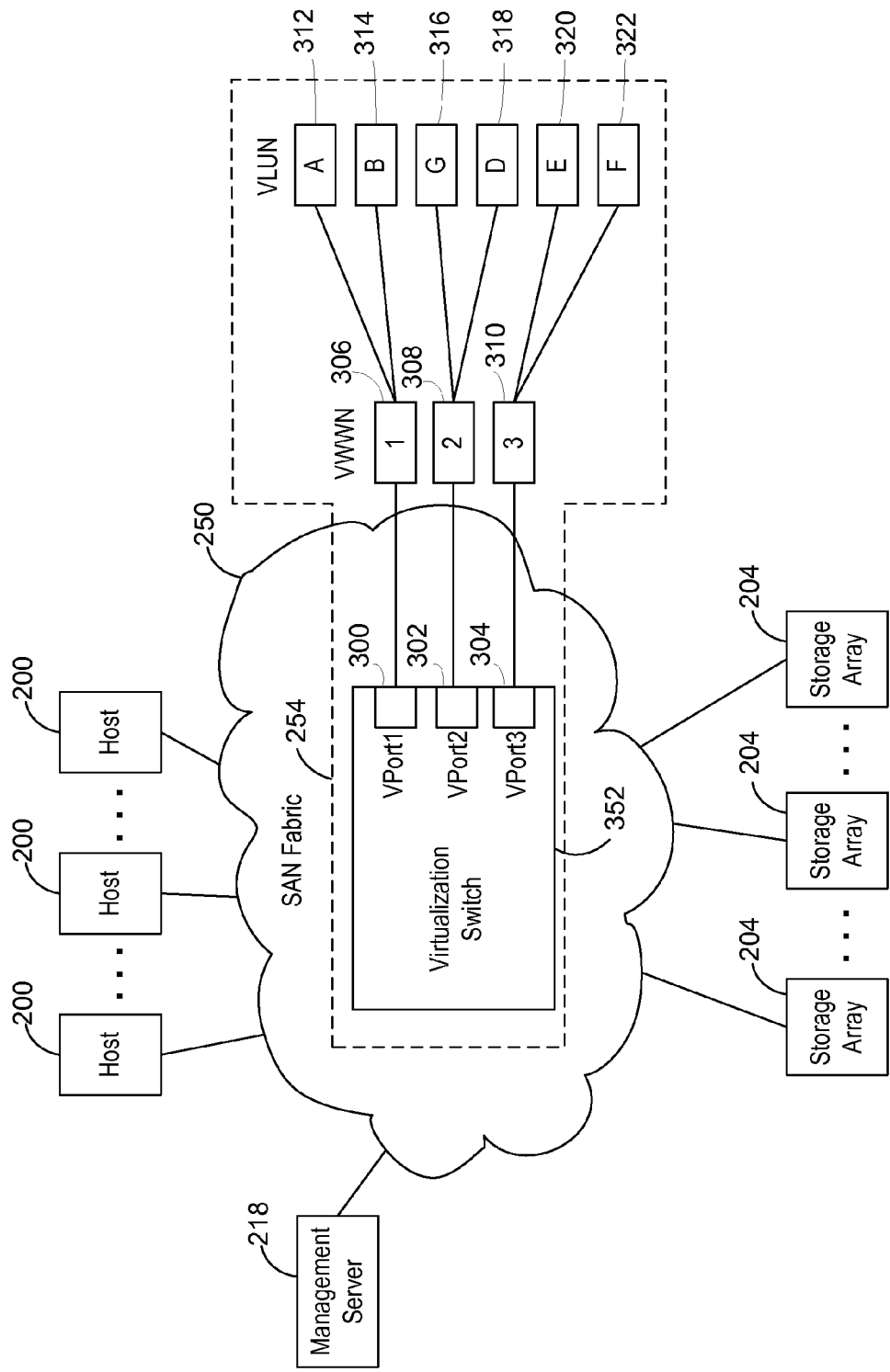
FIG. 3 is a block diagram of a SAN showing virtual ports, devices and logical units according to the present invention.

FIG. 3 illustrates the embodiment of FIG. 2 except that the virtualization switch 252 has been changed to a virtualization switch 352 with a series of virtual ports 300, 302, and 304. These virtual ports are logically connected, respectively, to virtual worldwide named (WWN) devices 306, 308, and 310. Each of these virtual WWN devices includes two virtual logic units or LUNs 312-322. In operation, the hosts 200 would address a particular virtual port, for example, virtual port 1 300 which would be the port connected for the virtual worldwide named device 306, which would include virtual LUNs A and B, 312 and 314. The virtual LUNs A and B 312 and 314 are the virtualized LUNs provided by the management server 218 to the hosts 200, with packets to those LUNs converted by the virtualization switch 352 into the proper physical packets. Thus the virtual LUNs and virtual worldwide named devices would map to various locations in the storage arrays 204 based on configuration information provided by the management server 218. However, the particular hosts 200 would believe that they were ports, devices and LUNs connected to the virtualization switch 352. As described below, because they are virtual ports, virtual worldwide names, and virtual LUNs, they can be readily moved by the virtualization switch 352 and connections from the particular hosts to the particular virtual LUNs can be changed to improve load balance or to provide for equipment failures.

Figure 4:
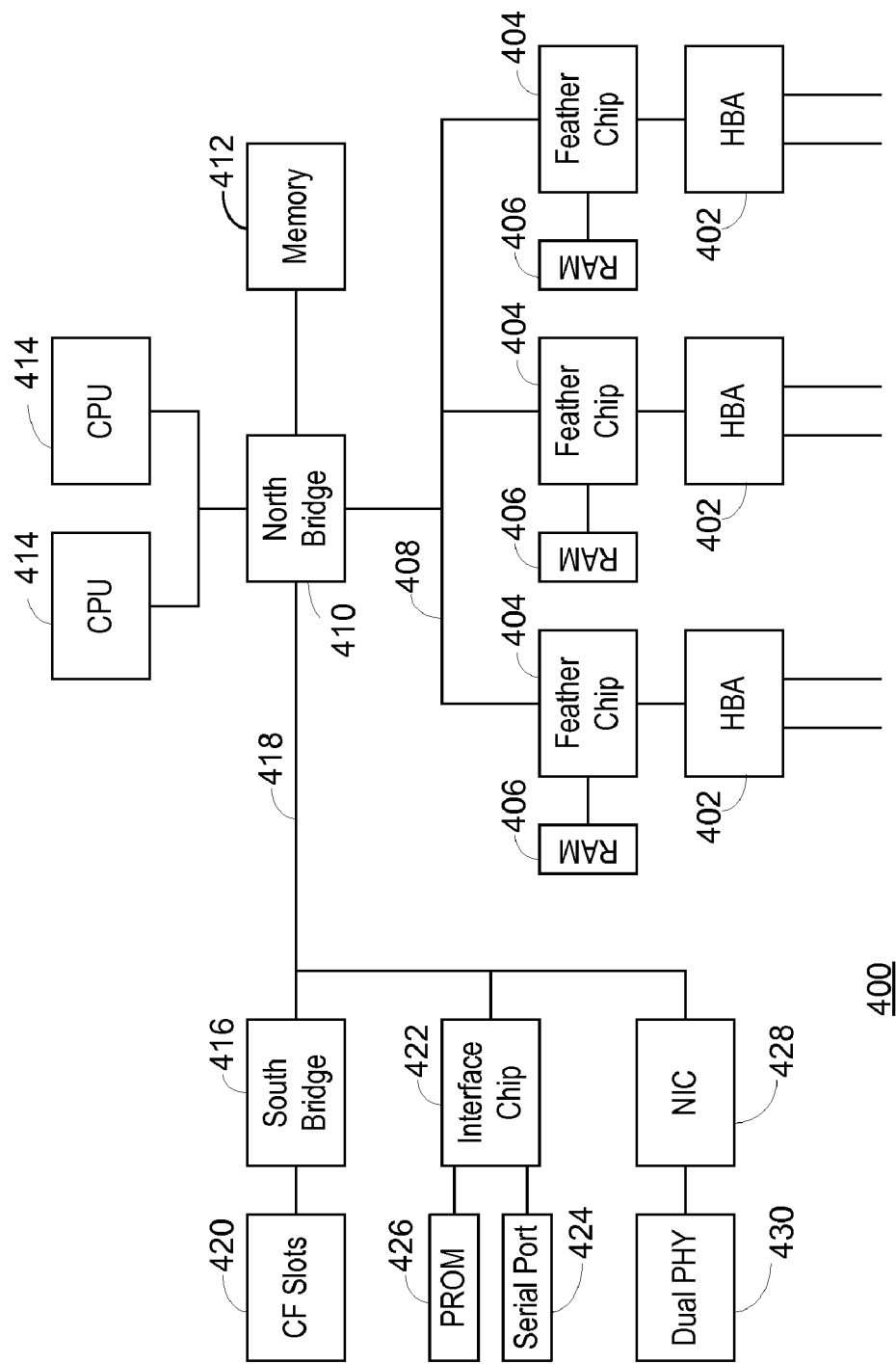
FIG. 4 is a block diagram of a first embodiment of a virtualization switch according to the present invention.

FIG. 4 illustrates a virtualization switch 400 according to the present invention. A plurality of HBAs 402 are provided to connect to the fabric of the SAN. Each of the HBAs 402 is connected to an ASIC referred to the Feather chip 404. The Feather chip 404 is preferably a PCI-X to PCI-X bridge and a DRAM memory controller. Connected to each Feather Chip 404 is a bank of memory or RAM 406. This allows the HBA 402 to provide any frames that must be forwarded for further processing to the RAM 406 by performing a DMA operation to the Feather chip 404, and into the RAM 406. Because the Feather chip 404 is a bridge, this DMA operation is performed without utilizing any bandwidth on the second PCI bus. Each of the Feather chips 404 is connected by a bus 408, preferably a PCI-X bus, to a north bridge 410. Switch memory 412 is connected to the north bridge 410, as are one or two processors or CPUs 414. The CPUs 414 use the memory 412 for code storage and for data storage for CPU purposes. Additionally, the CPUs 414 can access the RAM 406 connected to each of the Feather chips 404 to perform frame retrieval and manipulation as illustrated in FIG. 12. The north bridge 410 is additionally connected to a south bridge 416 by a second PCI bus 418. CompactFlash slots 420, preferably containing CompactFlash memory which contains the operating system of the switch 400, are connected to the south bridge 416. An interface chip 422 is connected to the bus 418 to provide access to a serial port 424 for configuration and debug of the switch 400 and to a ROM 426 to provide boot capability for the switch 400. Additionally, a network interface chip 428 is connected to the bus 418. A PHY, preferably a dual PHY, 430 is connected to the network interface chip 428 to provide an Ethernet interface for management of the switch 400. In normal operation, the HBA 402 receives a packet and analyzes the header. If a table entry is present in the RAM 406 indicating the packet is directed to a virtual device, the proper information, either physical storage unit or host, is retrieved and the header fields changed to redirect the packet. The altered packet is then provided from the HBA 402. For more details of operation, please refer to the applications incorporated above.

Figure 5:
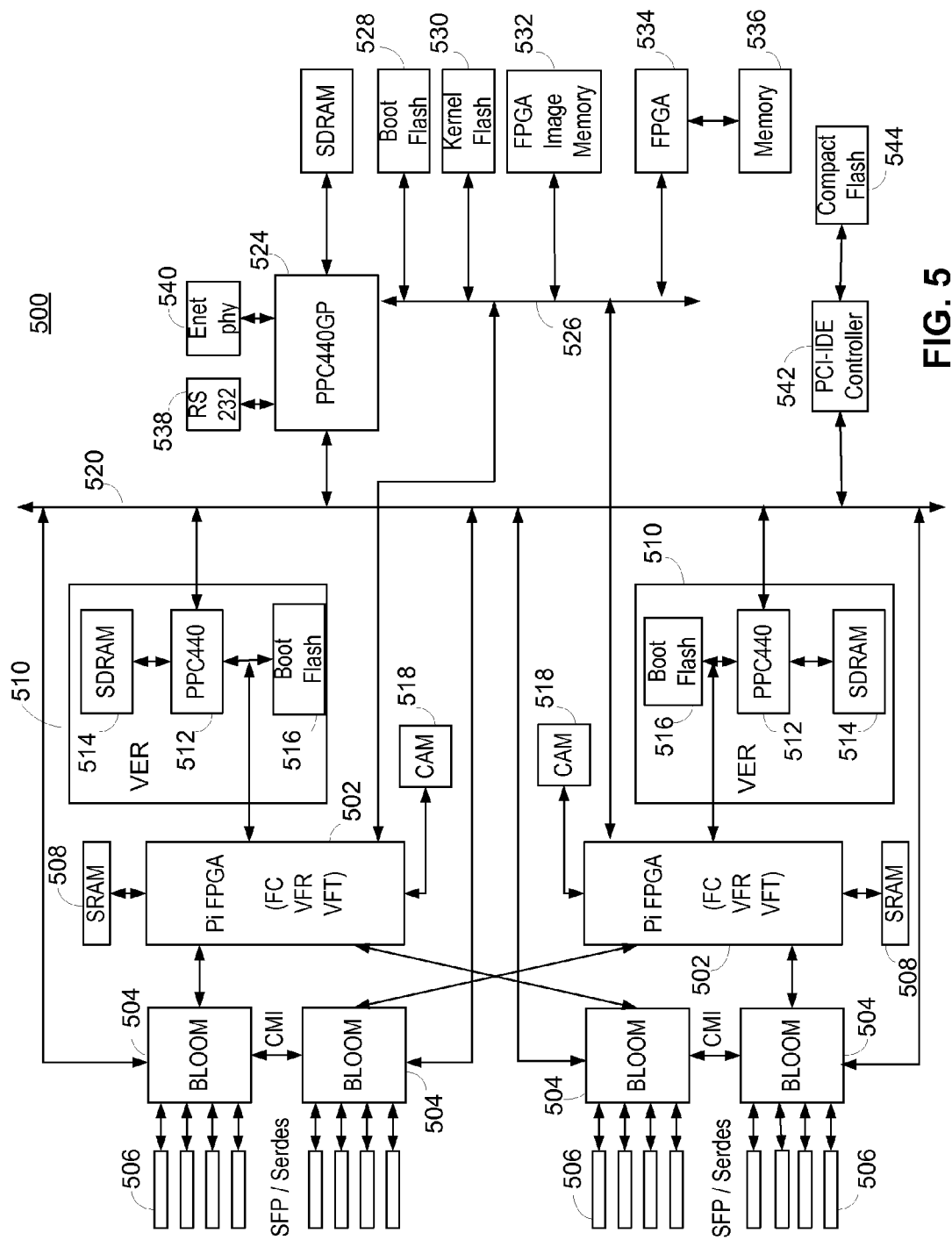
FIG. 5 is a block diagram of a second embodiment of a virtualization switch according to the present invention.

Proceeding now to FIG. 5, a diagram of a virtualization switch 500 according to the present invention is illustrated. In the virtualization switch 500 a pair of FPGAs 502, referred to as the pi FPGAs, provide the primary hardware support for the virtualization translations. Four Bloom ASICs 504 are interconnected to form to Bloom ASIC pairs. A more detailed description of the Bloom ASIC is provided in U.S. patent application Ser. No. 10/124,303, filed Apr. 17, 2002, entitled "Frame Filtering of Fibre channel Frames," which is hereby incorporated by reference. One of the Bloom ASICs 504 in each pair is connected to one of the pi FPGAs 502 so that each Bloom ASIC pair is connected to both pi FPGAs 502. Each of the Bloom ASICs 504 is connected to a series of four serializer/deserializer chips and SFP interface modules 506 so that each Bloom ASIC 504 provides four external ports for the virtualization switch 500, for a total of sixteen external ports in the illustrated embodiment. Also connected to each pi FPGA 502 is an SRAM module 508 to provide storage for the 10 tables utilized in remapping and translation of the frames. Each of the pi FPGAs 502 is also connected to a VER or virtualized exchange redirector 510, also referred to as a virtualization engine. The VER 510 includes a CPU 512, SDRAM 514, and boot flash ROM 516. In this manner, the VER 510 can provide high-level support to the pi FPGA 502 in the same manner as the CPUs 414 in the virtualization switch 400. A content addressable memory (CAM) 518 is connected to each of the pi FPGAs 502. The CAM 518 contains the VER map table containing virtual disk extent information.

A PCI bus 520 provides a central bus backbone for the virtualization switch 500. Each of the Bloom ASICs 504 and the VERs 510 are connected to the PCI bus 520. A switch processor 524 is also connected to the PCI bus 520 to allow communication with the other PCI bus 520 connected devices and to provide overall control of the virtualization switch 500. A processor bus 526 is provided from the processor 524. Connected to this processor bus 526 are a boot flash ROM 528, to enable the processor 524 to start operation; a kernel flash ROM 530, which contains the primary operating system in the virtualization switch 500; an FPGA memory 532, which contains the images of the various FPGAs, such as pi FPGA 502; and an FPGA 534, which is a memory controller interface to memory 536 which is used by the processor 524. Additionally connected to the processor 524 are an RS232 serial interface 538 and an Ethernet PHY interface 540. Additionally connected to the PCI bus 520 is a PCI IDE or integrated drive electronics controller 542 which is connected to CompactFlash memory 544 to provide additional bulk memory to the virtualization switch 500. Thus, as a very high level comparison between switches 400 and 500, the Bloom ASICs 504 and pi FPGAs 502 replace the HBAs 402 and the VERs 510 and processor 524 replace the CPUs 414. In normal operation, a pi FPGA 502 receives a packet and analyzes the header. If a table entry is present in the SRAM 508 indicating the packet is directed to a virtual device, the proper information, either physical storage unit or host, is retrieved and the header fields changed to redirect the packet. The altered packet is then provided from the pi FPGA 502 to the Bloom ASIC 504 and then to the fabric. Again, for more details of operation, please refer to the applications incorporated above.

Figure 6B:
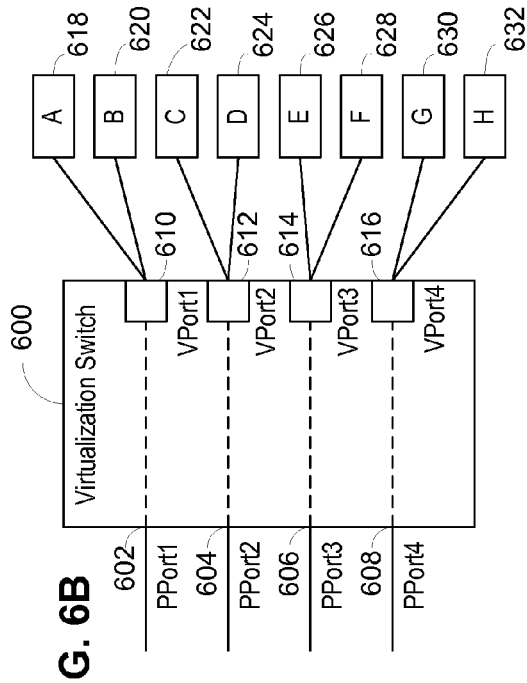
FIGS. 6A, 6B, and 6C are illustrations of a virtualization switch with a series of virtual ports and virtual LUNs in an original configuration and two alternative configurations.
Figure 6C:
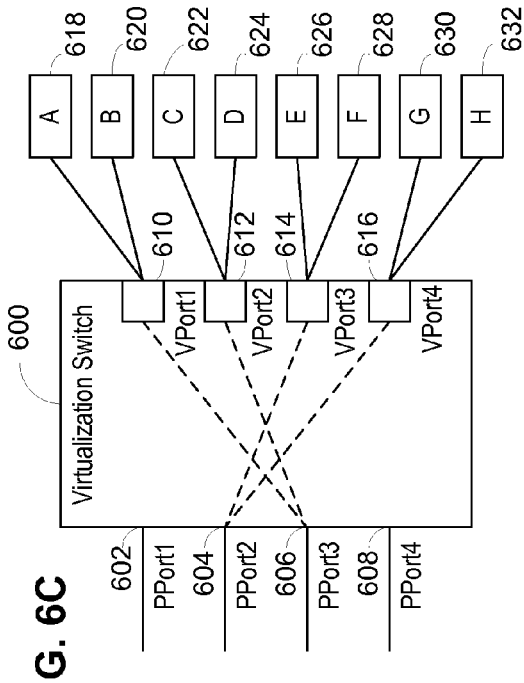
Figure 6A:
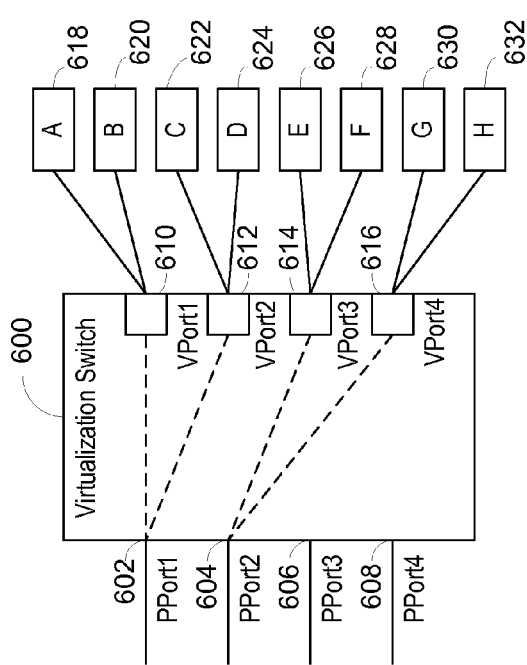

Referring now to FIG. 6A, a virtualization switch 600 is shown. A virtualization switch 600 includes four physical ports 602, 604, 606, and 608. It is also represented as including four virtual ports 610, 612, 614, and 616. According to the preferred embodiment of the present invention, each virtual port corresponds to a virtual device with a virtual WWN. Each of the virtual ports 610-616 also includes two virtual LUNs 618-632 as illustrated. In the illustration of FIG. 6A virtual port 1 610 and virtual port 2 612 are mapped to physical port 602 by the virtualization switch 600. That is, any frames directed to virtual port 1 600 or virtual port 2 612 will be provided to the virtualization switch 600 over the physical port 1 602. This would be done by having virtual ports 1 and 2 610 and 612 utilize different AL_PA addresses or lower byte of the Fibre Channel address while retaining the same high and middle bytes as the physical port 1 602. Thus, switches in the fabric would route based on the high and middle bytes, the domain and area or port bytes, so the frames would be routed to physical port 1 602. The virtualization switch 600 would then interpret these frames according to the full twenty-four bit address, using the lower byte to distinguish virtual ports/virtual devices. Similarly, the virtual port 3 614 and virtual port 4 616 are shown as being associated with the physical port 2 604. As can be seen, this would mean that two virtual ports and four virtual LUN devices would be connected through each of two physical ports and two of the physical ports would have no virtual devices whatsoever. This would thus present a relatively imbalanced situation.

This imbalance is corrected as shown in FIG. 6B. In this case there is a one-to-one mapping so each virtual port is connected to a single physical port. Thus physical port 1 602 is connected to virtual port 1 610, virtual port 2 604 is connected to virtual port 2 612 and so on. In this case, assuming relatively equal flow of traffic to the virtual ports, there would be relatively equal use of resources on the various physical ports. This would result in a more balanced situation in the SAN.

FIG. 6C illustrates a potential failure condition where communication using physical port 1 602 is disrupted. This could be due to a failure of the link to physical port 1 602, failure of the virtualization switch 600 (or physical port 1 602) or other reasons. In this case the virtualization switch 600 has reconfigured so that virtual ports 1 610 and virtual ports 2 612 have been connected logically to physical port 3 606. This would be done by simply changing the middle byte of the Fibre Channel address, as the domain or high byte would remain the same because it would still be the virtualization switch 600. The lower byte or AL_PA or loop address would remain the same, indicating virtual ports 1 and 2 610 and 612. A flow chart of initialization and operation of this movement is shown in FIG. 7.

Figure 7:
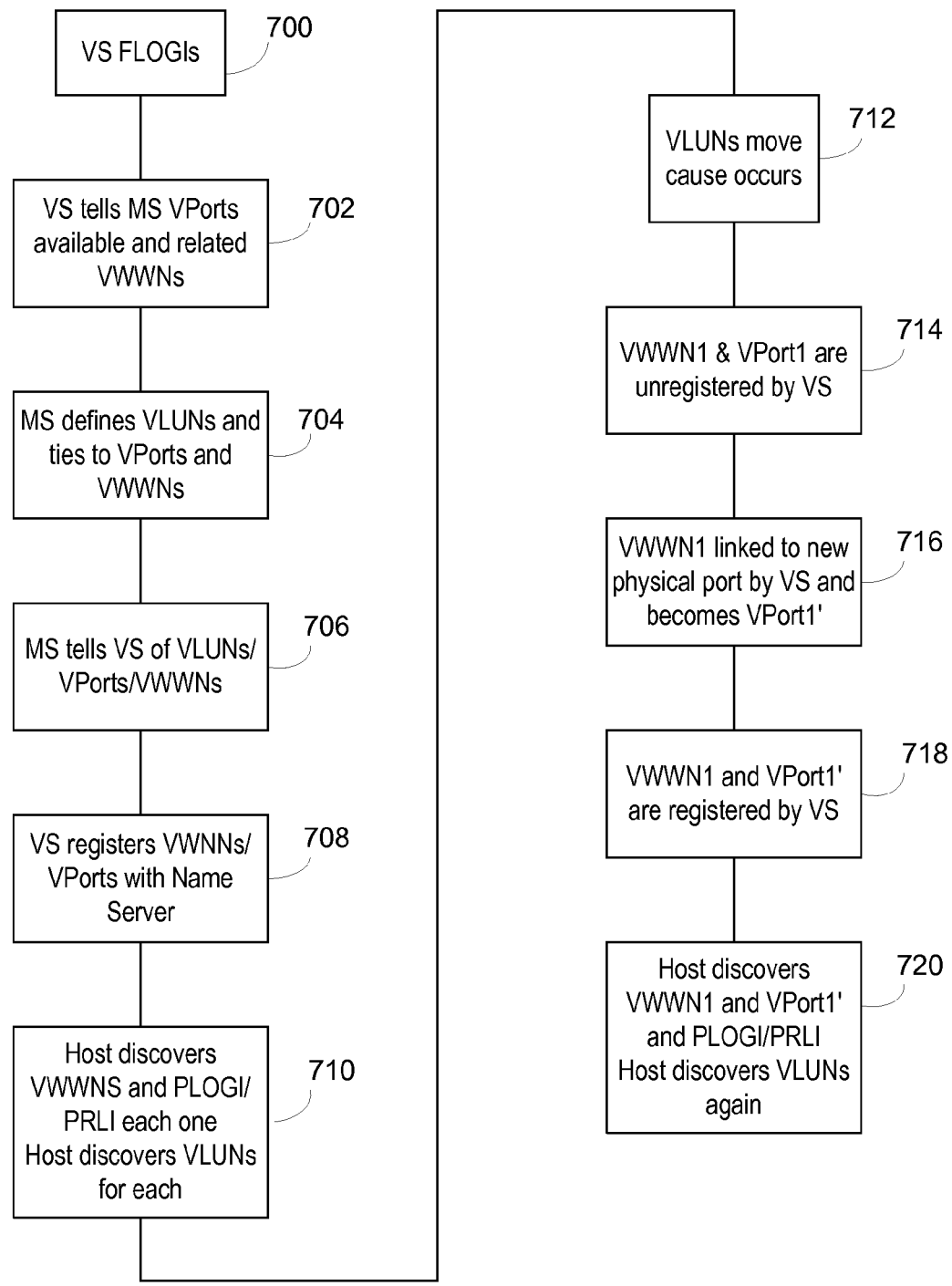
FIG. 7 is a flowchart of operations to first register and then move the virtual ports, devices and LUNs between different physical ports.

Referring then to FIG. 7, in step 700 the virtualization switch 600 FLOGIs the SAN to begin its initialization. In doing this the various physical ports of the virtualization switch 600 would be identified to the SAN, as would the virtualization switch itself. Next, in step 702, the virtualization switch 600 would provide a frame to the management server indicating which virtual ports are available and their related virtual worldwide names. This relationship is desirable because Fibre Channel hosts track resources based on worldwide names on a more permanent basis, as the worldwide names are unique. Thus, the management server 218 needs to know which virtual ports are present to enable proper routing and to know what the related virtual worldwide names are to allow reconfiguration. In step 704 the management server 208 defines the particular virtual LUNs in the virtualization system and ties those to the virtual or V-ports and virtual worldwide names (VWWNs) provided by the virtualization switch 600. In step 706 the management server 218 tells the virtualization switch 600 of the total relationship between the V-LUNs, V-ports, and VWWNs. This is generally also where the management server 218 would provide the virtual to physical mappings of the various VLUNs. In step 708 the virtualization switch 600 then registers, using FLOGI frames or other techniques, the VWNNs/V-ports with the name server of the SAN so that for all apparent purposes a series of virtual devices referred to by the VWWNs and connected to the V-ports are connected to the virtualization switch 600.

The virtualization switch 600 preferably registers the virtual devices as FCTYPE 8, SCSI, so that the hosts 200 can use SCSI commands, as they would with the physical storage units. In step 710, with this initialization complete, a host 200 will then discover the particular VWNNs of the virtualization switch 600 and perform a PLOGI and PRLI to each one of the particular WNNs to discover what the device is and what its capabilities are. The virtualization switch 600 would emulate the devices and provide appropriate responses. The host 200 will then use Fibre Channel FCP SCSI frames, such as Inquiry for SCSI-2 or Report LUNs for SCSI-3, to query each particular device to determine the particular virtual LUNs for each device. Again, the virtualization switch 600 would emulate the devices and provide appropriate responses, including the VLUN information. In this manner the host 200 will be able to have a complete FCP address for each of the virtual LUNs. In step 712 an event which causes the V-LUNs to move is assumed to occur. As noted above, this could be a desire to load balance or it could be a physical failure of a particular component. In step 714, the virtualization switch 600 unregisters an exemplary VWNN 1 and V-port 1 from the SAN. Then in step 716, the VWWN 1, the virtual device has been just unregistered, is linked to a new physical port by the virtualization switch 600 and thus becomes V-port 1' because of the change of the middle byte of the Fibre Channel address. For example, V-port 1 would have an address of D1, P1, 2, while V-port 1' would have an address of D1, P2, 2. While it is preferred to keep the AL_PA of the V-port the same, it can be changed if desired or if needed.

In step 718, the VWWN 1 and V-port 1' are registered by the virtualization switch 600 with the name server so that once again the particular device is present. Note that it has not been required to tell the management server 218 of this change with the management server 218 then reconfiguring each host 200, as the logic is already present in current Fibre Channel hosts to handle the moving of devices and LUNs between particular ports. But it would be advantageous to inform the management server 218 of the change so it can keep its tables coherent for use with future hosts.

In step 720 the host 200, now noting that there has been a new device added, rediscovers VWWN 1 at V-port 1' using PLOGI/PRLI commands and then using FCP commands to discover the particular V-LUNs that are still attached to the VWWN 1. In this case the host 200 will know the particular device has moved ports and the same LUNs are presented. Thus the particular LUNs will have moved from one physical port to another without requiring any actual physical reconfiguration of any particular devices. Thus, by configuration changes and software registration/unregistrations it is possible to move a particular virtual device and its virtual LUNs from one physical port to another to allow load balancing or fault tolerance.

The preferred operation of unregistering and registering the virtual port is preferred because it provides smoother operation. However, the unregistration could be omitted, leaving that to normal Fibre Channel failure mechanisms.

Figure 8:
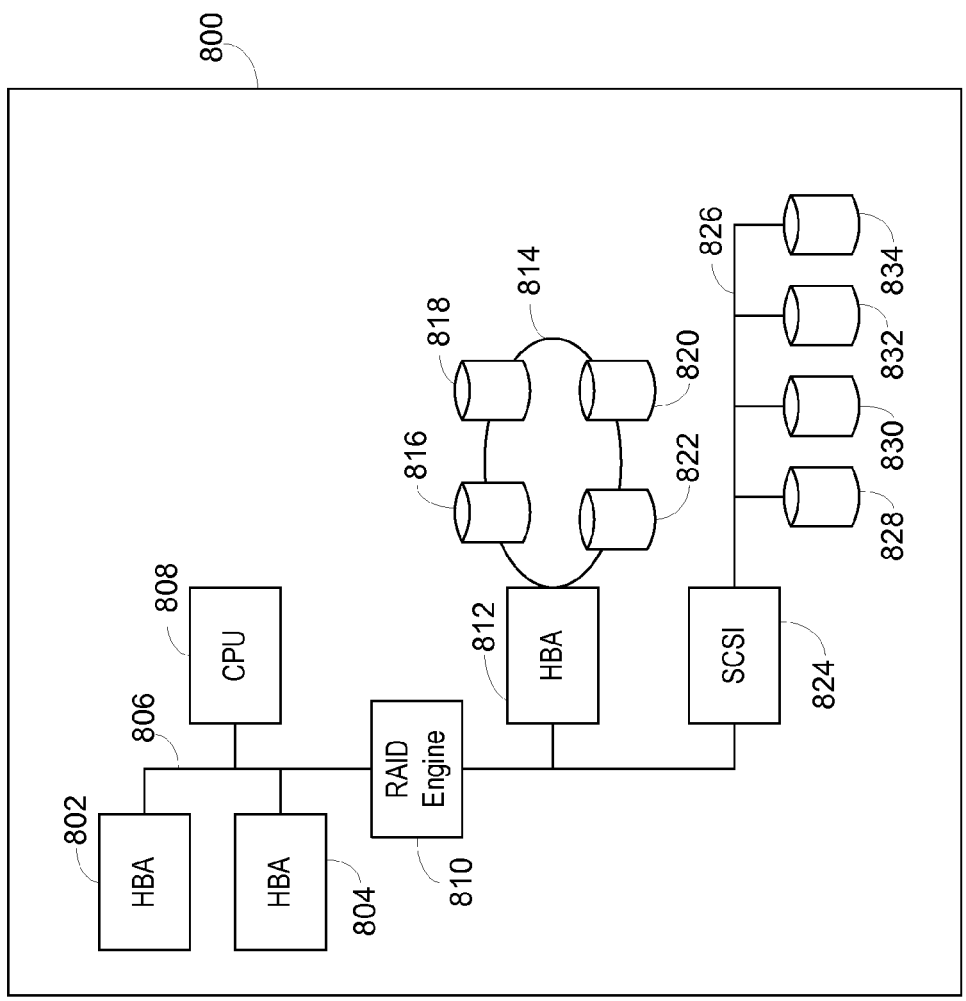
FIG. 8 is a block diagram of an exemplary storage unit.

The above has been described with relation to a virtualization switch in a SAN. However, it also similarly applies to a storage unit 800. Shown in FIG. 8 is an exemplary storage unit 800. There are two host bus adapters (HBAs) 802 and 804 which provide the Fibre Channel connectivity for the storage unit 800. These are connected by a backbone bus 806 to a CPU 808, which performs management and control operations of the storage unit 800. They are also connected to a RAID engine 810 because in the exemplary embodiment the storage unit 800 is a RAID unit. The RAID engine 810 in turn is connected in the illustrated embodiment to an HBA 812 which is connected to a Fibre Channel loop 814 containing four physical disk drives 816, 818, 820 and 822. Also shown for illustrative purposes the RAID engine 810 is connected to a SCSI controller 824, which has a SCSI bus 826 connected to physical disk drives 828, 830, 832, and 834. This combined use of a Fibre Channel loop and a SCSI bus is exemplary as it would not be normal in a typical storage unit 800. This is the physical representation of the storage unit 800 and a logical representation of the storage unit 800 to a host 200 would be that it would be a single WWN for each HBA, with a series of LUNs, tied to that HBA, with the RAID engine 810 properly striping the LUN data across the various disk drives. This is conventional.

Figure 9:
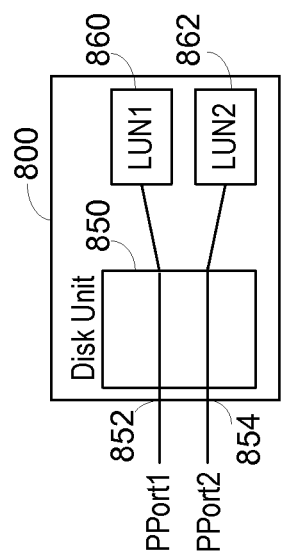
FIG. 9 is a logical diagram of the storage unit of FIG. 8.

This logical relationship is shown in more detail in FIG. 9. The storage unit 800 includes a disk unit 850 with physical ports 852 and 854. Physical port 852 is connected to a LUN 860, while physical port 854 is connected to a LUN 862. This is the normal configuration for a storage unit.

Figure 10A:
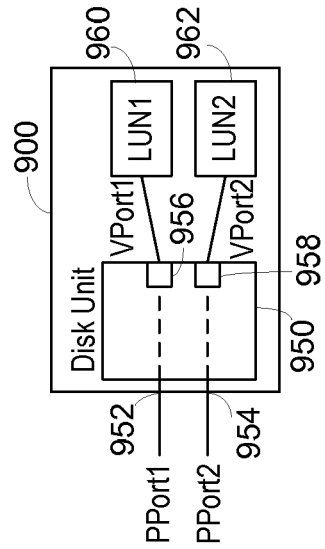
FIGS. 10A, 10B, and 10C are the original connections of a storage unit according to the present invention followed by a port failure in that unit and a reconfiguration of that unit to address the failure.

The preferred embodiment of a storage unit 900 is shown in FIG. 10A. A disk unit 950 has two physical ports 952 and 954. It also has two virtual ports 956 and 958. A LUN 960 is connected to virtual port 956 and a LUN 962 is connected to virtual port 958. In this original configuration, physical port 952 is mapped to virtual port 956 and physical port 954 is mapped to virtual port 958. As in the virtualization switch example, the virtual ports are distinguished from the physical ports by use of the AL_PA bits. It is understood that FIG. 10A is a simplification in that it only shows one fabric and that a conventional HBA includes two ports which are connected to redundant fabrics. However, the drawing is illustrative.

Figure 10B:
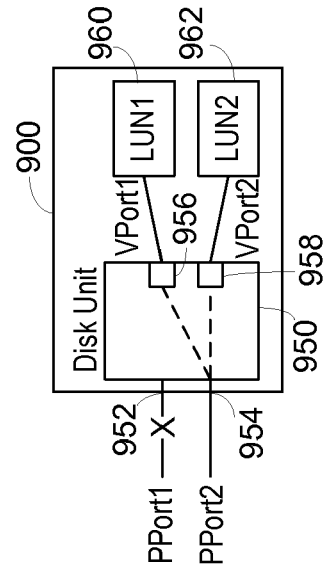
Figure 10C:
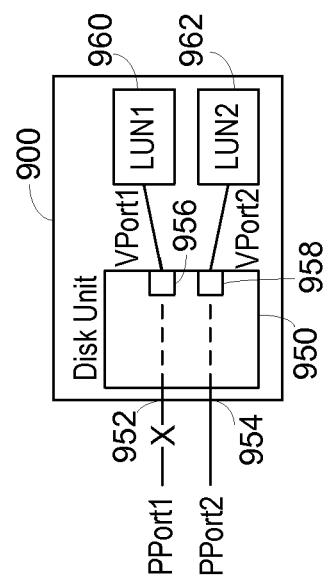

FIG. 10B illustrates the disk storage unit 900 except that the physical port 952 is no longer operational for a multitude of causes, such as the link being disabled, the physical port being disabled or other reasons. Thus, communications to LUN 960 are stopped. Referring to FIG. 10C, the storage unit 900 then reconfigures the disk unit 950 so that virtual port 956 is now logically connected to physical port 954 so that LUN 960 is still accessible by the host devices. The performance may be somewhat diminished in this operation but the LUN 960 is still fully accessible, unlike situations in the prior art where the LUN 960 would no longer be accessible.

While the above descriptions illustrate moving the virtual WWNs and virtual ports between physical ports on a single physical device, with proper coordination the virtual device represented by the virtual WWN could readily be moved between two different physical devices. In this case, the domain or upper byte of the address would change and the middle byte or area or port byte may change.

As illustrated by these descriptions of the preferred embodiments, systems according to the present invention allow movement of virtual devices and LUNs to different physical ports, thus allowing load balancing or improved fault tolerance.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

The invention claimed is:

1. An apparatus, comprising:
  a plurality of network ports, a first port of said plurality of network ports to provide for apparent linkage to a device, a first address of the device being associated with said first port of said plurality of network ports, so that a worldwide name of the device is associated with said first port of said plurality of network ports; and
  an element that provides a second address associated with a different port of said plurality of network ports, said second addresses being associated with said worldwide name of the device to provide for apparent linkage to said different port of said plurality of network ports.

2. The apparatus of claim 1, wherein said element provides said second address associated with said different port of said plurality of network ports when there is a communication failure using said first port of said plurality of network ports.

3. The apparatus of claim 1, wherein there is additional communication traffic on at least two of said plurality of network ports and wherein said element provides said second address associated with said different port of said plurality of network ports to improve communication traffic balance on the at least two of said plurality of network ports.

4. The apparatus of claim 1, wherein the device comprises a virtual device and wherein said worldwide name of the device comprises a unique worldwide name associated with said virtual device.

5. The apparatus of claim 4, wherein said virtual device comprises a virtual LUN and said element responds to queries to said virtual device by providing said virtual LUN.

6. The apparatus of claim 1, wherein said apparatus is a storage unit and wherein said apparatus further comprises at least one hard disk drive.

7. A method implemented in an apparatus, comprising:
providing, by the apparatus, for an apparent linkage to a device by associating a first address of the device with a first port of a plurality of network ports of the apparatus so that a worldwide name of the device is associated with the first port of the plurality of network ports; and
providing, by the apparatus, a second address associated with a different port of the plurality of network ports, said second address being associated with the worldwide name of the device to provide for an apparent linkage to the different port of the plurality of network ports.

8. The method of claim 7, wherein said providing of the second address associated with the different port of the plurality of network ports occurs when there is a communication failure using the first network port.

9. The method of claim 7, wherein there is additional communication traffic on at least two of the plurality of network ports and wherein said providing of the second address associated with the different port of the plurality of network ports occurs to improve communication traffic balance on the at least two of the plurality of network ports.

10. The method of claim 7, wherein the device comprises a virtual device and wherein the worldwide name comprises a unique worldwide name associated with the virtual device.

11. The method of claim 10, wherein the virtual device comprises a virtual LUN and the method further comprises responding, by the apparatus, to queries to the virtual device by providing the virtual LUN.

12. The method of claim 7, wherein the apparatus is a virtualization switch.

13. The method of claim 7, wherein the apparatus is a storage unit.

14. A fabric comprising:
a first apparatus including:
a plurality of network ports, a first port of said plurality of network ports to provide for apparent linkage to a device, a first address of the device being associated with said first port of said plurality of network ports, so that a worldwide name of the device is associated with said first port of said plurality of network ports; and
an element that provides a second address associated with a different port of said plurality of network ports, said second addresses being associated with said worldwide name of the device to provide for apparent linkage to said different port of said plurality of network ports,
a second device having a second port coupled to said first network port; and
a third device having a third port coupled to said different network port.

15. The fabric of claim 14, wherein said element provides said second address associated with said different port of said plurality of network ports when there is a communication failure using said first network port.

16. The fabric of claim 14, wherein there is additional communication traffic on at least two of said plurality of network ports and wherein said element provides said second address associated with said different port of said plurality of network ports to improve communication traffic balance on the at least two of said plurality of network ports.

17. The fabric of claim 14, wherein the device comprises a virtual device and wherein said worldwide name comprises a unique worldwide name associated with said virtual device.

18. The fabric of claim 17, wherein said virtual device comprises a virtual LUN and said element responds to queries to said virtual device by providing said virtual LUN.

* * * * *